(12) United States Patent
Zimmermann et al.

(10) Patent No.: US 6,375,171 B1
(45) Date of Patent: Apr. 23, 2002

(54) VIBRATION DAMPER

(75) Inventors: Helmut Zimmermann, Berglen; Horst Otterbach, Waiblingen; Bernhard Dürr, Stuttgart; Manfred Rabis, Schorndorf; Karl-Heinz Klöpfer, Winnenden; Klaus Martin Uhl, Baltmannsweiler; Günter Wolf, Oppenweiler; Rebekka Helfen, Stuttgart, all of (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/658,132

(22) Filed: Sep. 8, 2000

(30) Foreign Application Priority Data

Sep. 11, 1999 (DE) .......................................... 199 43 629

(51) Int. Cl.$^7$ ................................................. F16M 1/00
(52) U.S. Cl. ................... 267/137; 267/140.12; 267/179
(58) Field of Search .............................. 267/136, 1.37, 267/140.11, 140.12, 179; 30/381–385; 173/162.1, 162.2

(56) References Cited

U.S. PATENT DOCUMENTS 5,368,107 A   11/1994   Taomo 5,697,456 A * 12/1997 Radle ..................... 173/162.2

FOREIGN PATENT DOCUMENTS

GB           1170313         11/1969

* cited by examiner

Primary Examiner—Christopher P. Schwartz
Assistant Examiner—E. T. Bartz
(74) Attorney, Agent, or Firm—Walter Ottesen

(57) ABSTRACT

The invention relates to a vibration damper between a housing (4), which holds an internal combustion engine, and a handle (3) fixed on the housing (4). The handle (3) is for holding and guiding the motor-driven chain saw (2) during use thereof. The vibration damper (1) is a coil spring (5) which is fixed at a first end (10) thereof with an attachment element (7) to the handle (3) and, at a second end (20), the coil spring is fixed with a further attachment element (30) to the housing. A part turn of the end (10, 20) of the coil spring (5) is held form-tightly to the attachment element (7, 30) in the direction of its longitudinal center axis (25). To provide a torsion-free assembly of the coil spring, it is provided that the coil spring (5) can be assembled from one of its ends (20) between the handle (3) and the housing (4) and be secured at least at one of its ends (20) to the attachment element (30) against a rotational movement in the peripheral direction.

26 Claims, 10 Drawing Sheets

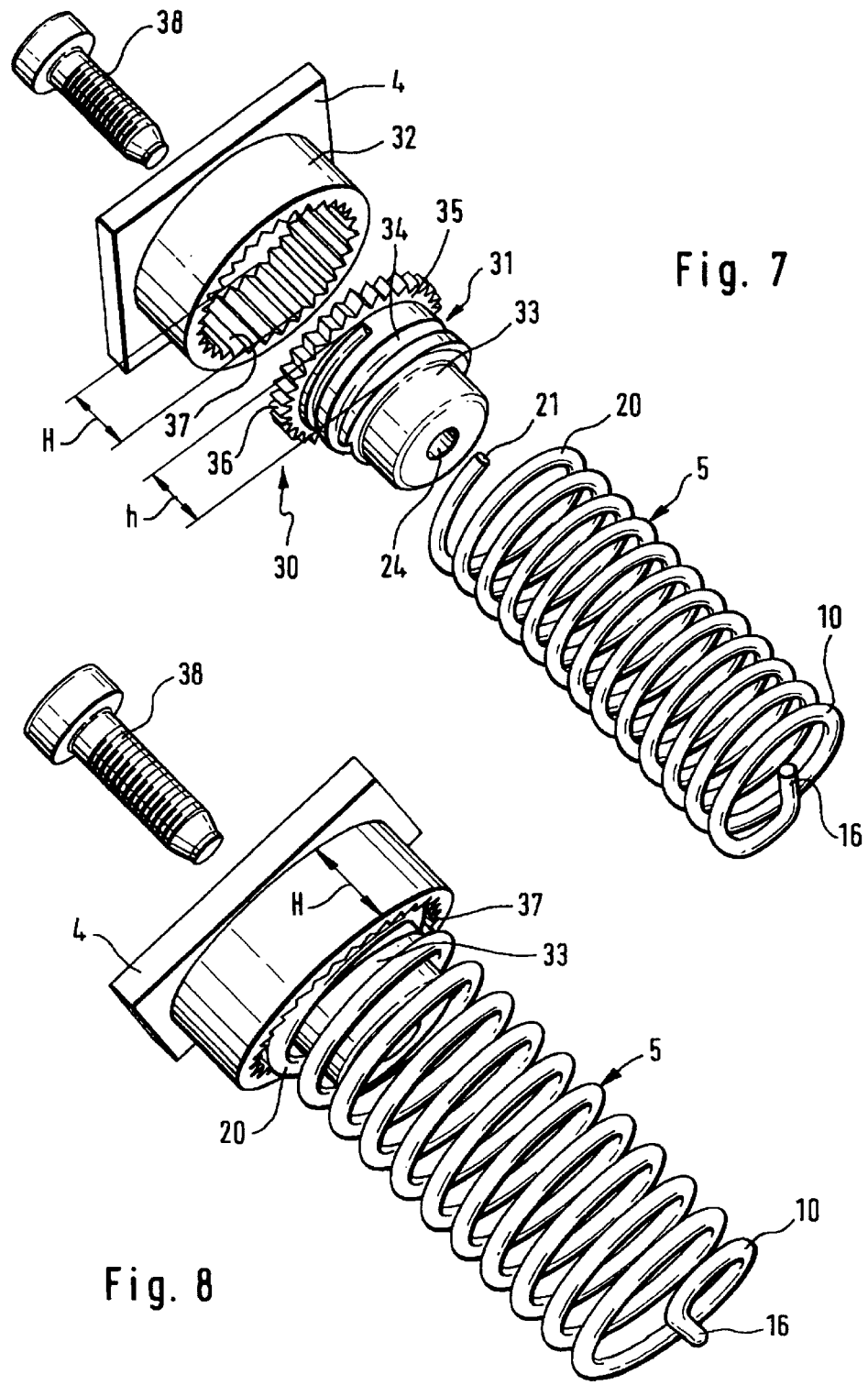

VIBRATION DAMPER

FIELD OF THE INVENTION

The invention relates to a vibration damper between two components of a portable handheld work apparatus such as a motor-driven chain saw, a cutoff machine, a blower or the like. The vibration damper is especially mounted between a housing holding an internal combustion engine and a handle for guiding the work apparatus with the handle being attached to the housing.

BACKGROUND OF THE INVENTION

U.S. Pat. No. 5,368,107 discloses an arrangement of a vibration damper between the housing of a motor-driven chain saw and the handle thereof. The vibration damper comprises a coil spring and each end of the coil spring can be fixed by means of attachment dome which is radially expandable. For this purpose, the attachment dome is expanded by screwing in a threaded attachment fastener. In assembly, it cannot be avoided that the attachment dome rotates with the threaded fastener in the rotational direction. In this way, a torsion force is introduced into the coil spring which cannot be normally reduced so that the vibration damper can have different effects depending upon the assembly.

British Patent 1,170,313 discloses an arrangement of barrel-shaped coil springs between an engine housing and a handle. The barrel-shaped tapered coil springs are each to be fixed by attachment screws arranged in the direction of the longitudinal axis of the screws. This arrangement also cannot be assembled without torsion forces building up so that the vibration-dampening characteristics can be affected disadvantageously.

SUMMARY OF THE INVENTION

It is an object of the invention to provide a vibration damper which is so improved that it can be mounted any number of times between components to be damped and each time be free of torsion.

The vibration damper assembly of the invention is disposed between first and second components of a portable handheld work apparatus wherein the first component is a handle for use by an operator for guiding the work apparatus and the second component is a housing accommodating a motor generating vibrations. The vibration damper assembly includes: a coil spring defining a longitudinal center axis and having first and second ends; a first mount provided on the first component for holding the coil spring at the first end thereof; a second mount provided on the second component for holding the coil spring on the second end thereof; the first and second mounts lying approximately on the longitudinal axis and being spaced at a distance from each other; means for facilitating mounting the coil spring between the first and second mounts from one of the first and second ends of the coil spring; and, one of the mounts corresponding to the one end of the coil spring and the one end including means for holding the one end of the coil spring form-tight so as to prevent a rotational movement of the coil spring in the peripheral direction thereof.

The assembly of the coil spring from only one of its ends between the components ensures a simple assembly. Rotational forces which possibly act on the coil spring during the assembly are reduced because the second end is not yet fixed. The first end of the coil spring is mounted from this second end. In the assembly at the second end, the coil spring is form-tight secured against a rotational movement acting in the peripheral direction so that occurring rotational forces are absorbed via the form-tight connection. Stated otherwise, the coil spring remains free of torsion.

The coil spring is free of torsion forces because of the configuration of the vibration damper of the invention so that vibration dampers, which are mounted and configured in the same manner, have the same vibration damping characteristics which are determined exclusively by the material characteristics of the selected coil spring.

According to a further embodiment of the invention, the first end of the coil spring is screwed through the second component in order to assemble this first end. The components themselves can be so aligned in the desired assembly position and can be connected to each other so as to be vibration dampened by a simple mounting of the coil spring from one of its ends. In this way, advantages are afforded in the manufacture as well as in the maintenance of the work apparatus provided with the vibration damper of the invention.

Advantageously, the attachment element is configured as an attachment module having several assembly elements coacting with each other. The attachment module advantageously comprises a connecting element which grabs the end of the coil spring in a form-tight manner and this connecting element is held and secured so that it cannot rotate in a receptacle of the component with which the end of the coil spring is to be connected. Here, it can be advantageous to permit the coil spring to engage form-tightly into the attachment element with an end segment which is bent over radially and especially into that allocated component on which the coil spring is to be fixed.

BRIEF DESCRIPTION OF THE DRAWINGS

The invention will now be described with reference to the drawings wherein:

FIG. 7 is an exploded view showing the attachment element provided at the second end of the coil spring;

FIG. 8 is a perspective view of the assembled attachment element of FIG. 7;

DESCRIPTION OF THE PREFERRED EMBODIMENTS OF THE INVENTION

Figure 1:
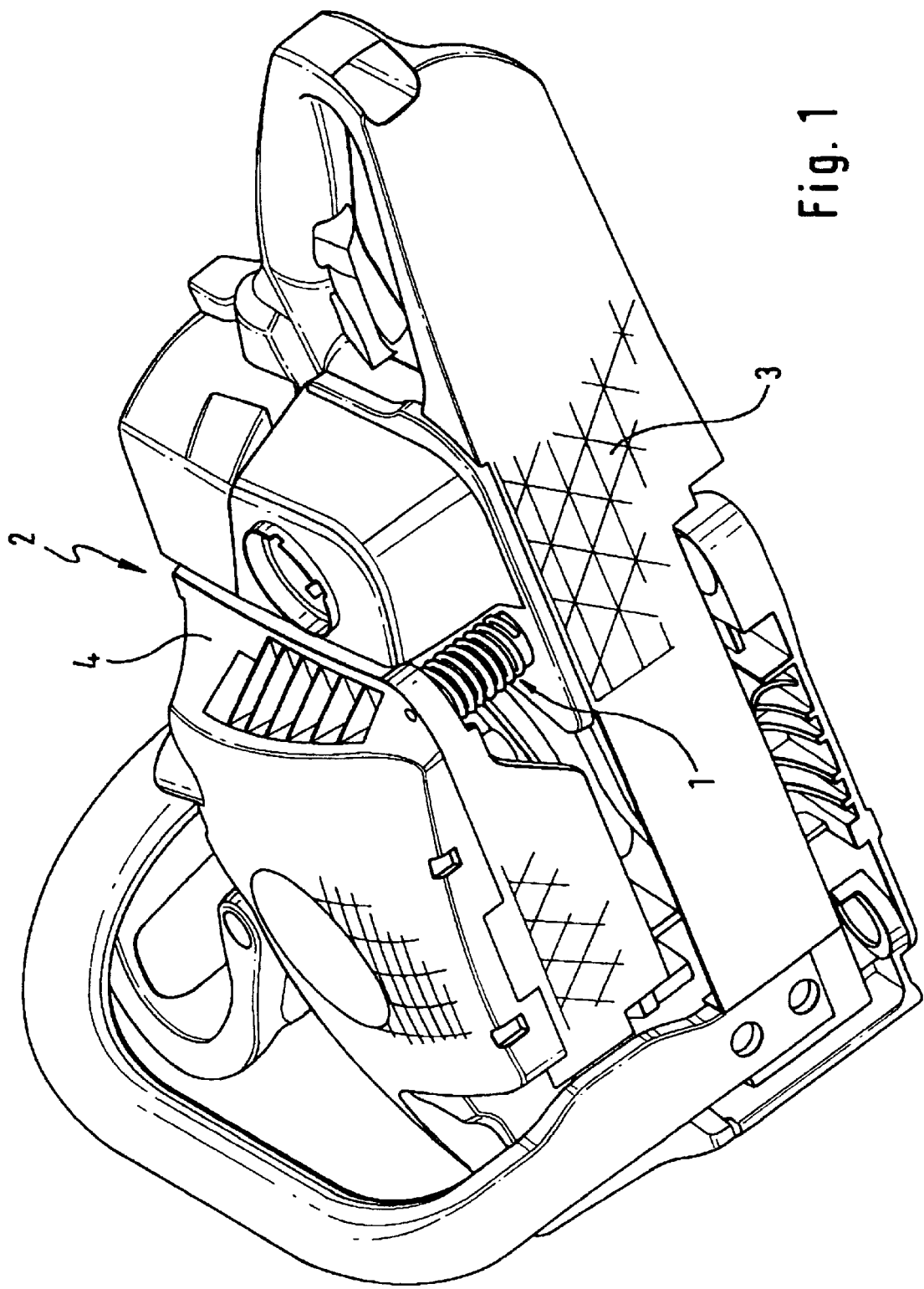
FIG. 1 is a perspective view of a motor-driven chain saw provided with a vibration damper according to the invention.
Figure 2:
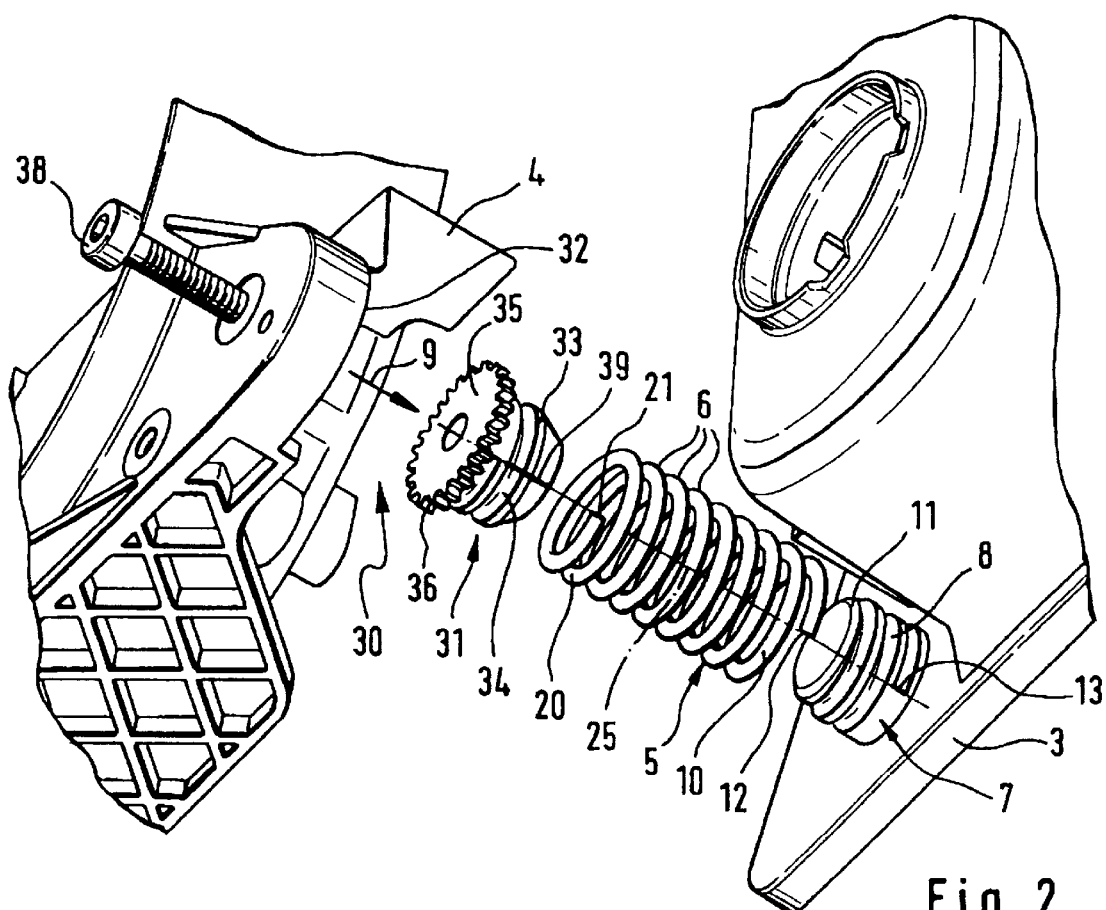
FIG. 2 is an exploded view of the vibration damper of FIG. 1.
Figure 3:
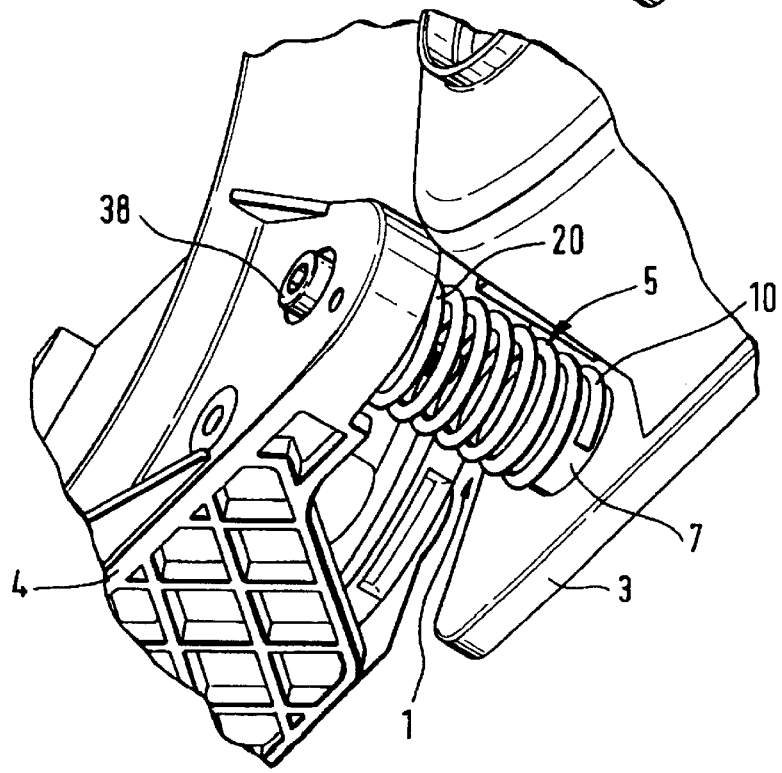
FIG. 3 is a detail view of the vibration damper of the invention shown in FIG. 2.

FIGS. 1 to 3 show the arrangement of the vibration damper 1 according to the invention arranged between two components 3 and 4 on a portable handheld work apparatus. In the embodiment shown, the work apparatus is a motor-driven chain saw. The motor-driven chain saw essentially includes a housing 4 defining a second component wherein an internal combustion engine (not shown) is mounted for driving the work apparatus. A handle 3 is attached to the housing 4 and defines the first component. The handle serves to permit an operator to guide the work apparatus during use thereof. Vibration dampers 1 are to be mounted between the housing 4 and the handle 3 in order to keep vibrations of the engine away from the handle held by the user.

The arrangement of the vibration damper 1 is explained in the context of a motor-driven chain saw. In a similar manner, vibration dampers of this kind according to the invention can be used on cutoff machines, brushcutters, blowers or the like.

The vibration damper 1 of the invention comprises a coil spring 5 which is wound cylindrically in the embodiment shown and includes several turns 6 lying at a spacing one to the other. The first end 10 of the coil spring 5 is screwed onto a dome-shaped attachment element 7 of the first component 3, namely, the handle, as shown in FIG. 2. The attachment element 7 consists especially of plastic. For this purpose, the dome-shaped attachment element 7 has especially a multiple outer thread 8. The coil spring 5 can be threadably engaged on the attachment dome 7 from its second end 20 as indicated by the arrow direction 9. The end 11 of the attachment element faces toward the coil spring 5 and is lightly machined or chamfered for this purpose.

With the other or second end 20, the coil spring 5 is fixed to the second component 4 via a further attachment element 30 which is preferably made of plastic. The component 4 is the housing of the work apparatus.

The further or second attachment element 30 is configured as an attachment module comprising several assembly elements coacting with each other. Essentially a connecting element 31 is provided which grasps the end 20 of the coil spring 5 in a form-tight manner. The connecting element 31 is held and secured in a receptacle 32 of the housing component 4 so that it cannot rotate. In the embodiment of FIGS. 1 to 3, the connecting element 31 is configured as an attachment dome 33 engaging into the end 20 of the coil spring 5. The attachment dome 33 preferably has a multiple outer thread 34 in which the end turns of the end 20 of the coil spring 5 engage and are held axially in a form-tight manner.

To assemble the coil spring 5 between the components 3 and 4, the coil spring 5 is first screwed onto the outer thread 8 of the attachment dome 7 until the end face 12 of the first end comes into contact at the thread end 13 of the outer thread 8. Thereafter, the connecting element 31, which is configured as attachment dome 33, is rotated into the second end 20 of the coil spring 5 until the end face 21 of the end turn comes into contact engagement at the end of the outer thread 34 on the connecting element 31. The coil spring 5 is held form-tightly via the threads 8 and 34 in the direction of the longitudinal center axis 25 of the coil spring 5. The attachment elements 7 and 30 lie at an axial spacing to each other.

Figures 4, 5:
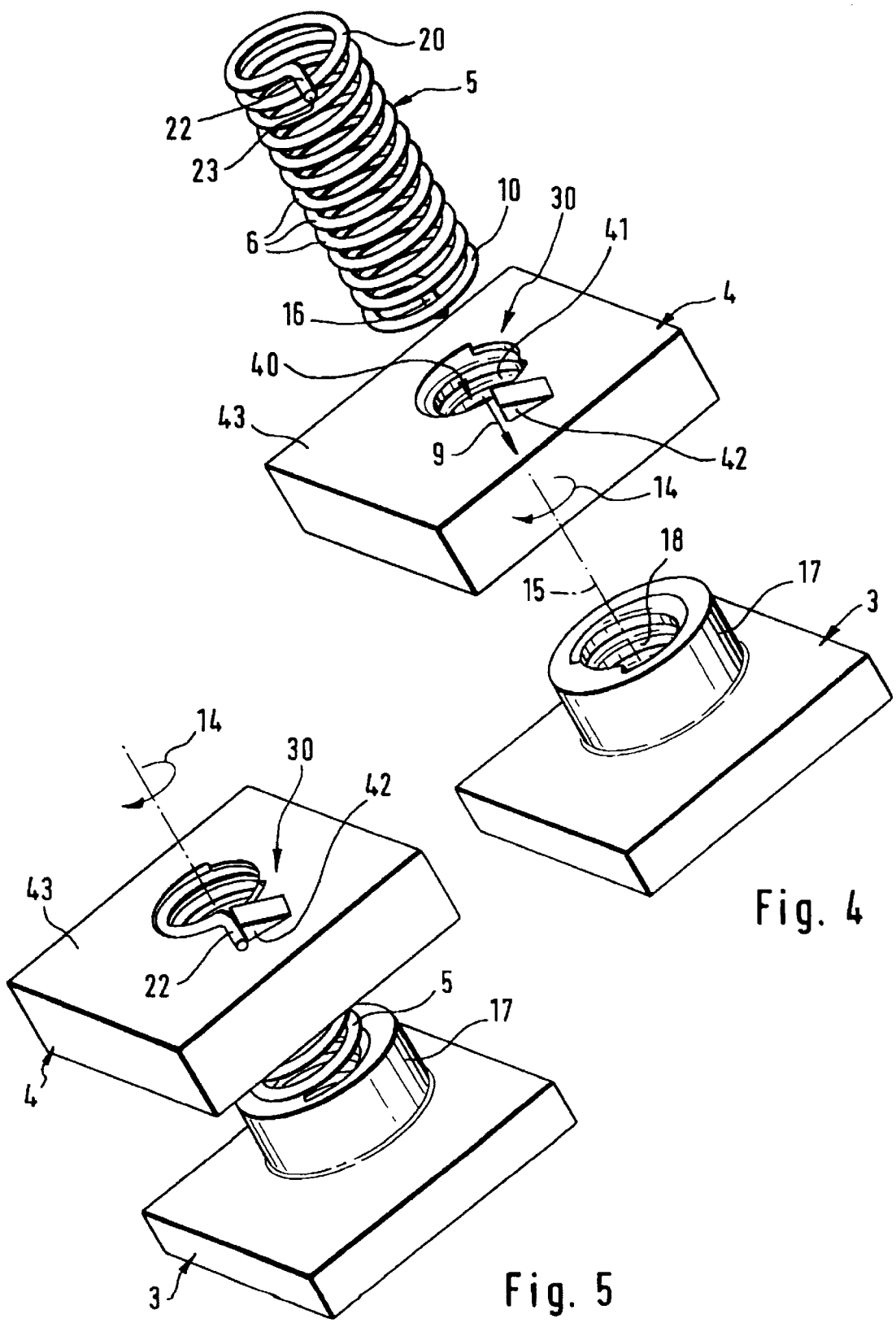
FIG. 4 is an exploded view of the vibration damper to be mounted between two components.
FIG. 5 shows the vibration damper of FIG. 4 in the mounted position.

The connecting end 31 is connected to the coil spring in the same assembly direction 9. The housing component 4 is seated on the connecting element 31 which engages into a corresponding receptacle 32 of the second component 4. In the embodiment of FIG. 4, the connecting element 31 has a base plate 35 at an end face thereof and this face plate extends beyond the diameter of the attachment dome 33 and its edge has a set of teeth 36 as shown, for example, in FIG. 7. The set of teeth 36 engages in an inner counter set of teeth 37 of the receptacle 32 provided in the second component 4 whereby the connecting element 31 is connected to the housing component 4 so that it cannot rotate in the peripheral direction of the coil spring 5. An attachment screw 38 is screwed in to axially secure the connecting element 31 in the receptacle 32. The attachment screw 38 penetrates the base of the receptacle 32 and engages centrally in the attachment dome 33. It can be purposeful to configure the attachment dome with axial slits 39 which are radially expandable whereby a tight contact of the outer thread 34 is ensured against the end turns of the coil spring 5. Because of the first set of teeth 36 and the second set of teeth 37, the connecting element 31, and therefore the coil spring 5 connected thereto, are secured in a form-tight manner against a rotational movement acting in the peripheral direction (for example, arrow direction 14) of the coil spring 5. An unintended loosening of the coil spring, which defines the vibration damper, is thereby reliably prevented.

Figure 6:
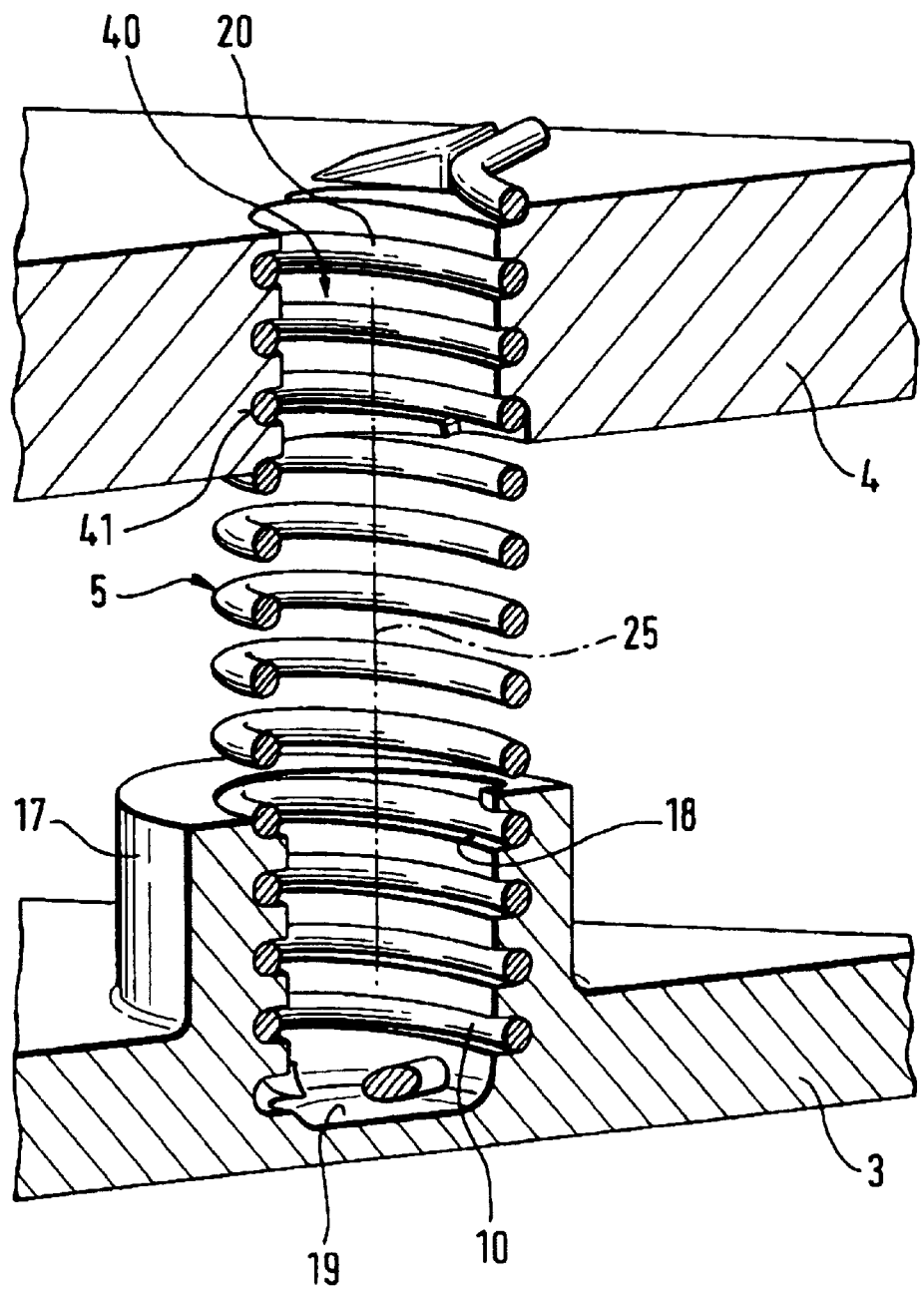
FIG. 6 is a schematic axial section taken through the vibration damper of FIG. 5.

As shown in FIGS. 4 to 6, the first end of the coil spring 5 can be screwed through the second component 4, namely the housing, to assemble the coil spring. In FIGS. 4 to 6, the components 3 and 4 of the work apparatus are only shown schematically. The component 3, namely the handle, carries a bushing-shaped attachment element 17 which is configured in the form of a blind hole as shown in FIG. 6 and has especially a multiple thread inner winding 18 into which the end 10 of the coil spring 5 can be screwed.

The attachment element 30 is assigned to the first component 4 and, in the embodiment of FIGS. 4 to 6, is configured as a through bore 40 having a continuous inner winding 41, especially having multiple threads. The attachment element 30 is configured as an attachment module and includes a rotation stop 42 which coacts with a radial counter stop 22 of the coil spring 5. The rotational stop 42 is provided at the end of the through bore 17 facing away from the first attachment element 17. The rotational stop 42 is especially provided on the end face 43 of the through bore 40 facing away from the first attachment element 17. The counter stop 22 is defined by the end section 23 of the last coil spring turn. The end section 23 is bent away radially toward the outside.

For assembly, the first component 3 and the second component 4 are aligned with respect to each other so that the inner winding 18 of the first attachment element 17 and the inner winding 41 of the second attachment element 30 lie approximately on a common longitudinal center axis. Then, the coil spring 5 is screwed into the through bore 40 in the screw direction 14 in the direction of arrow 9. The screw-in rotational direction 14 is selected so that the developed rotational forces act in the sense of a reduction of the turn diameter. In this way, a simple rotating is ensured. The rotational force is applied to the first end 10 lying forward in the direction of arrow 9. For this purpose, the end section 16 of the end turn is bent over radially inwardly and can be grasped by a rotation tool which engages into the coil spring 5 from the other second end 20. The coil spring 5 is screwed in through the inner winding 41 of the second component (the housing component 4) until the first end 10 engages in the inner winding 18 of the first attachment element 17 and preferably strikes the base 19 of the bushing-shaped attachment element 17 as shown in FIG. 6. The length of the coil spring 5 is so set that, when the first end 10 comes up against the base 19 of the first attachment element 17, the counter stop 22 has run past the rotational stop 42 in the rotational direction 14. Here, the rotational stop 42 is configured as a ramp increasing in the screw-in rotational direction 14. The counter stop 22 lies axially against the end face 43 and ensures that the end 20 cannot be screwed through the inner winding 41 of the through bore 40. The counter stop 22 lies against the perpendicular stop surface of the ramp 42 opposite to the screw-in rotational direction 14 when the coil spring 5 is mounted so that a loosening of the coil spring opposite to the screw-in rotational direction 14 is reliably A prevented. The coil spring is form-tightly secured against a rotational movement operating in the peripheral direction at its second end 20 on the attachment element 30, that is, the coil spring is secured in the screw-in rotational direction 14 by an axial contact engagement at the end face 43 and opposite to the screw-in rotational direction 14 by the blocking rotational stop 42.

In the embodiment shown in FIGS. 7 and 8, the first end 10 of the coil spring 5 is provided with an end section 16 bent over radially into the diameter of the coil spring so that the coil spring can be screwed into a bushing-shaped attachment element 17 as shown in FIG. 6. The other second end 20 of the coil spring is screwed onto a connecting element 31 corresponding to FIG. 2 in order to connect the coil spring to the housing component 4 in a form-tight manner so it does not rotate. The connecting element 31 is configured as an attachment dome 33 having an outer thread 34. The base plate 35 is formed at the end face and extends with its peripheral edge beyond the diameter of the attachment dome 33 and has a set of teeth 36 formed uniformly over the outer edge of the edge portion. This first set of teeth 36 meshes with a second set of teeth 37 of a cup-shaped receptacle 32. The receptacle 32 is preferably configured as one piece with the housing component 4 so that the connecting element 31, which engages in the second set of teeth 37 so as not to rotate, is connected to the housing component 4 so that it cannot rotate with respect thereto.

As FIG. 8 shows, the elevation H of the cup-shaped receptacle 32 corresponds approximately to the elevation (h) of the outer thread 34 of the attachment dome 31 so that also the end 20 of the coil spring is surrounded by the receptacle 32 in the assembled position according to FIG. 8. Preferably, this takes place with only little play whereby the end 20 of the coil spring 5 is ensured against expanding by the wall of the receptacle 32. The end 20 of the coil spring 5 lies between the outer thread 34 of the attachment dome 33 and the inner set of teeth 37 of the receptacle 32. Preferably, the set of teeth 37 is configured continuously over the periphery and extends over the entire elevation H of the receptacle 32.

An attachment screw 38 is screwed into the attachment dome 33 for axially securing the connecting element 31 in the receptacle 32. The attachment element 30 is preferably made of plastic. For this reason, the screw 38 can be a self-cutting threaded screw which can be screwed into a central bore 24 of the attachment dome 33.

Figure 9:
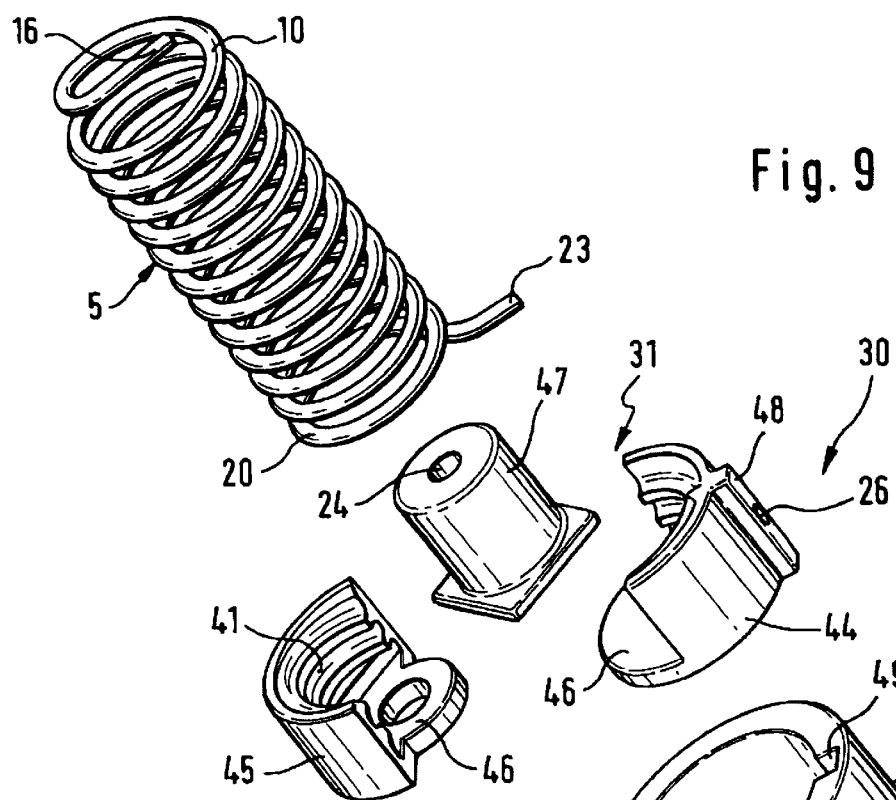
FIG. 9 is an exploded view of an embodiment of a further attachment element.
Figure 10:
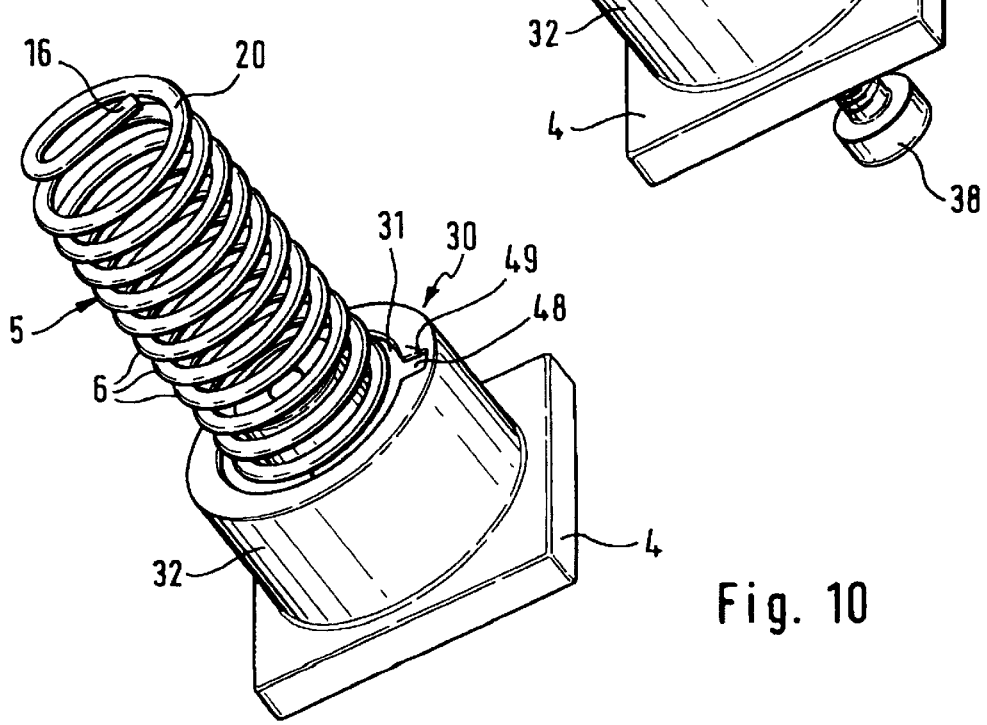
FIG. 10 is a perspective view showing the attachment element of FIG. 9 mounted to the coil spring.
Figure 11:
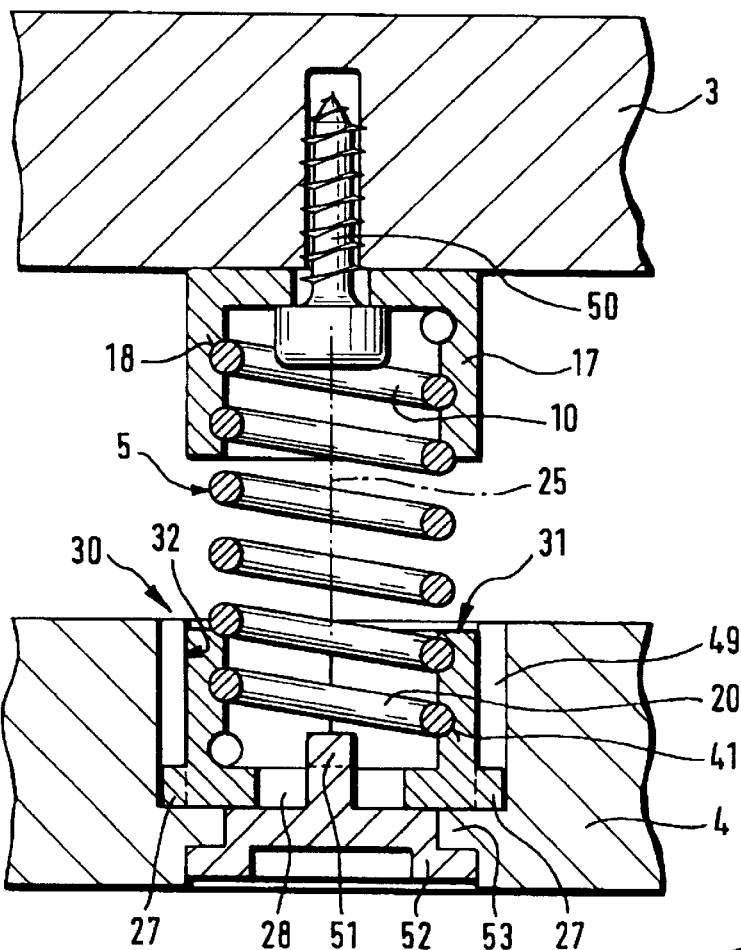
FIG. 11 is a section view of a further embodiment of an attachment element in the form of an attachment module.
Figure 12:
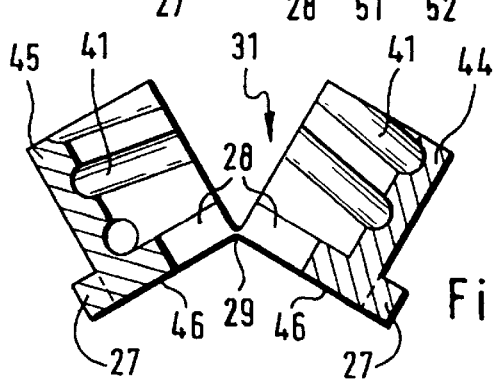
FIG. 12 is a section view of a connecting element of the attachment module for grasping the end of the coil spring.

In the embodiment of FIGS. 9 and 10, a further attachment element 30 is provided for the second end 20 of the coil spring 5. The coil spring 5 is, as described in FIG. 6, screwed into a first bushing-shaped attachment element with the first end 10, whereafter the additional attachment element 30 is assembled on the second end 20.

In the embodiment of FIGS. 9 and 10, the additional element 30 comprises a bushing-shaped connecting element 31 which engages around the end 20 of the coil spring to be held and has a corresponding inner thread 41. The connecting element 31 comprises two bushing halves 44 and 45 which are joined radially to a bushing. The two bushing halves (44, 45) have base areas 46 which mutually engage and on which a screw dome 47 is placed, which projects into the end 20 of the coil spring 5, and is held especially so as to not rotate. For assembling the attachment element, first the screw dome 47 is axially seated in the end 20 of the coil spring 5 and, thereafter, the two bushing halves 44 and 45 are radially placed on the end 20. The spring turns come to rest in the inner thread 41 of the bushing halves 44 and 45. For a connection of the coil spring 5 with the connecting element 31 of the attachment element 30 such that there is no rotation, the end section 23 of the end turn is bent over radially outwardly and engages in a corresponding opening 26 of the one bushing half 44. The opening preferably lies in an outer axial rib 48 which projects radially beyond the outer wall of the bushing half 44. Preferably, the end section 23 ends in the opening 26 so that the end section 23 does not project out of the rib 48. The connecting element 31, which is fixed on the end 20, is axially placed in the receptacle 32 which has an inner axial slot 49 corresponding to the rib 48 via which the connecting element 31 is held in the receptacle 32 so that it cannot rotate. An attachment screw 38, which engages in the attachment dome 47, axially secures the connecting element 31 in the receptacle 32 whereby the spring end 20 cannot axially separate from the housing component 4 of the work apparatus as well as being fixed form-tightly so that it cannot rotate. The attachment screw 38 engages through the base of the receptacle 32 as well as the base areas 46 of the bushing halves 44 and 45 and engages in the screw dome 47 which can be preferably provided as a radially expandable component. With the screwing-in of the attachment screw 38, the screw dome 47 is radially expanded and so secures the turns of the end 20 in the inner thread 41 of the bushing halves 44 and 45. The assembled position of the attachment element 30 on the end 20 of the coil spring 5 is shown in FIG. 10.

The embodiment of FIGS. 11 to 15 corresponds, in principle, to the embodiment of FIGS. 9 and 10. Starting from the end 20 of the coil spring 5, the end 10 is fixed in a bushing-shaped attachment element 17. The bushing-shaped attachment element 17 in this embodiment can be fixed to the first component 3 via an attachment screw 50.

Figure 13:
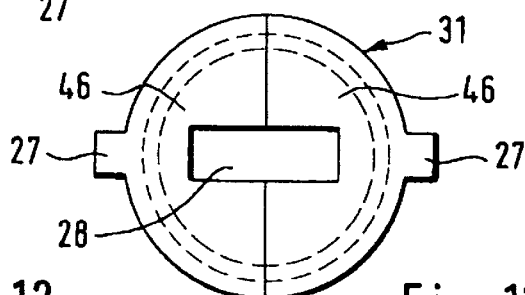
FIG. 13 is a plan view of the base of the connecting element of FIG. 12.
Figure 14:
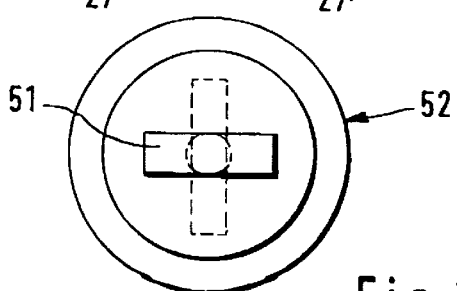
FIG. 14 is a plan view of a locking element coacting with the connecting element.

Thereafter, a bushing-shaped connecting element 31 is assembled over the end 20 of the coil spring S. The connecting element 31 comprises two bushing halves 44 and 45 whose base portions 46 are connected to each other via a film hinge 29 (see FIG. 12). As shown in FIG. 13, a transverse slit 28 is provided in the base 46 which serves for engaging a bayonet-like locking element 51 of a locking cover 52.

Each bushing half (44, 45) has an outer lug-shaped rib projection 27 assigned to corresponding axial slots 49 in the receptacle 32 fixed on the housing. The housing-fixed receptacle is configured as a through opening having an inner annular shoulder 53 on which the base of the connecting element 31 rests. The locking cover 52 is seated on the end of the through opening of the receptacle 32 facing away from the first end 10 and the cover 52 is likewise supported on the annular shoulder 53 and engages with its closure element 51 into the slit 28 in the base 46 of the closure element 31.

Figure 15:
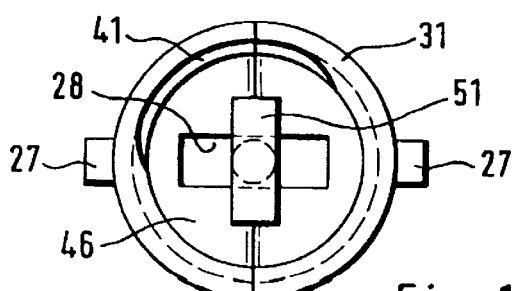
FIG. 15 is a plan view which shows the bayonet connection latched between the connecting element and the locking element.

As shown in the plan view of FIG. 15, the locking cover 52 is rotated with its locking element 51, which lies in the transverse slit 28, by 90° relative to the bushing-shaped connecting element 31 which lies via the rib projection 27 in the receptacle so that it cannot rotate. The locking element 51 engages over the longitudinal edges of the transverse slit 28 in the latch position shown in FIG. 15 whereby a form-tight connection is provided axially between the locking cover 52 and the bushing-shaped connecting element 31. The bushing-shaped connecting element 31 is fixed in the receptacle 32 of the component 4 with this bayonet connection.

Figure 16:
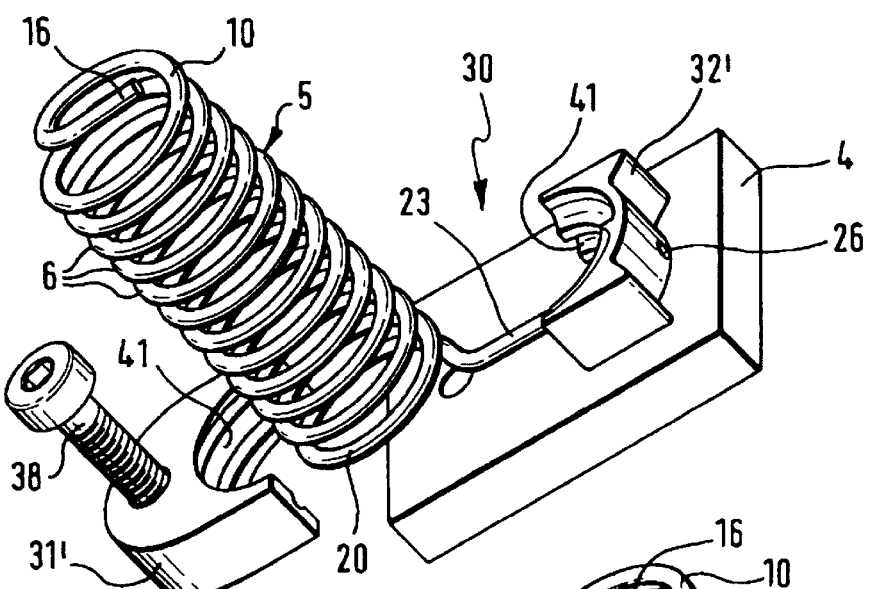
FIG. 16 is a perspective view of a further embodiment of an attachment element arranged at the end of a coil spring.
Figure 17:
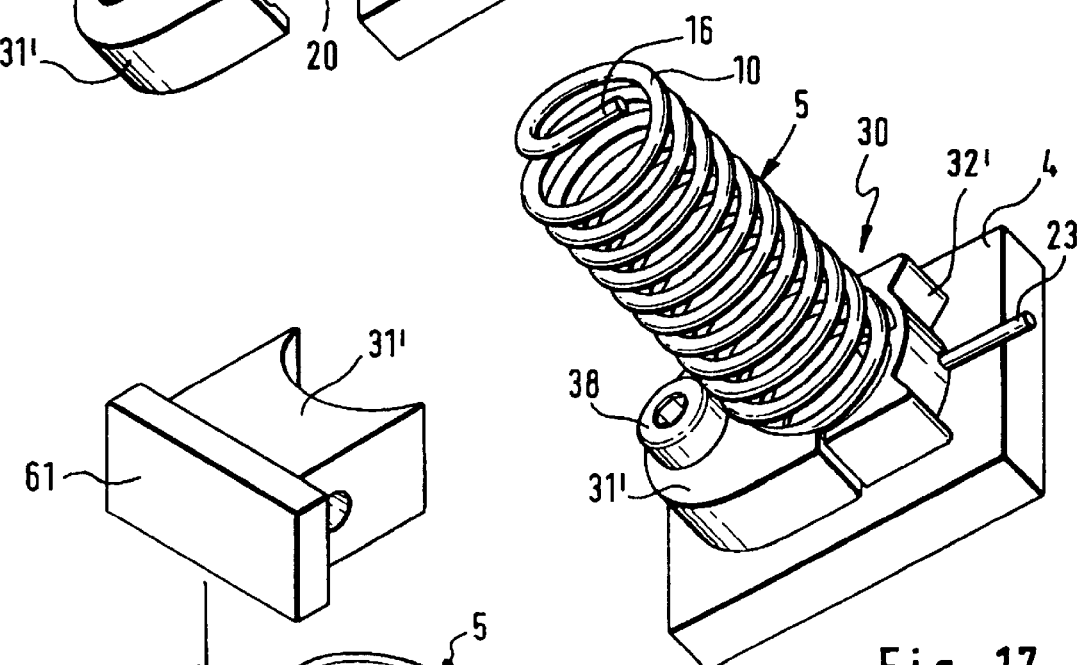
FIG. 17 is a perspective view showing the assembled attachment element according to FIG. 16.
Figure 18:
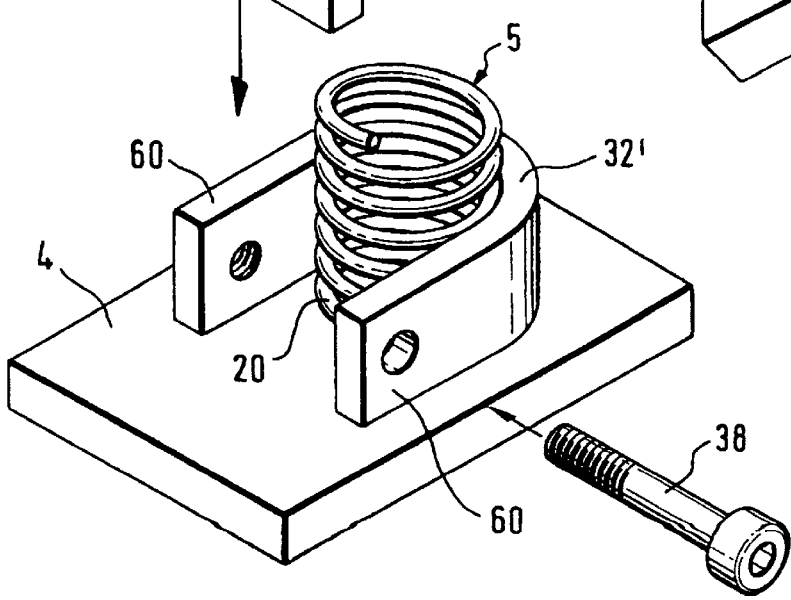
FIG. 18 is a schematic representation of a further embodiment of an attachment element.

In the embodiment of FIGS. 16 to 18, the half-cylindrically configured connecting element 31' supplements the receptacle 32', which is fixed to the housing, radially to a bushing via which a the coil spring 5 is fixedly connected to the component 4 of the work apparatus. The bushing engages completely over the end 20 of the coil spring 5. For fixing the end 20 against rotation, the end section 23 of the turn is bent over radially toward the outside and engages an opening 26 in the receptacle 32'. As shown in FIG. 17, the end section 23 projects out of the partial-cylindrical receptacle 32' in the assembled position. The partial-cylindrical receptacle 32' is fixed to the component 4 of the work apparatus by an attachment screw 38.

In the embodiment of FIGS. 16 and 17, the partial-cylindrical connecting element 31' is supplemented with the partial-cylindrical receptacle 32' to the attachment element 30.

In the embodiment of FIG. 18, the receptacle 32' is configured so as to be U-shaped. A transverse piece 61 is held between the legs 60 of the receptacle 32' and this transverse piece holds the partial-cylindrical receptacle 32'. The transverse piece 61 is fixed by an attachment screw 38 which engages through the transverse piece and the corresponding openings in the legs 60.

Figure 19:
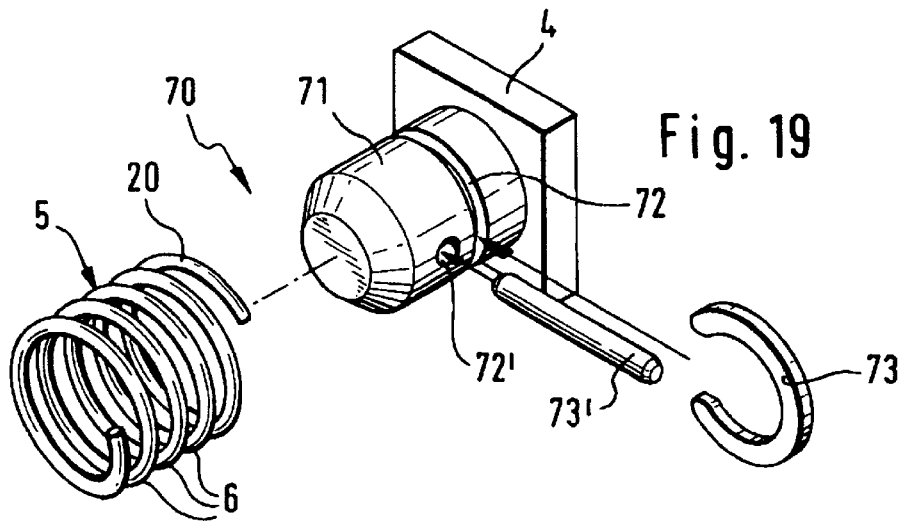
FIG. 19 is a schematic of a further embodiment of a dome-shaped attachment element engaging into the coil spring.

In the embodiment of FIG. 19, an attachment element 70 is shown which includes a lug 71 which, for example, engages in the end 20 of a coil spring 5. The lug 71 has a peripheral slot 72 which functions to hold a holding ring 73. After seating the coil spring 5 on the lug 21, the holding ring 73 is fixed in the peripheral slot 72 between the turns 6 of the coil spring. The turns 6 lie at a spacing to each other. In this way, the coil spring 5 is held on the lug 71 so that it cannot axially separate. The lug 71 can be fixedly screwed onto the component 4 of the work apparatus or can be configured as one piece with the component 4.

Alternatively to the holding ring 73, a holding pin 73' can be used which can be seated into a corresponding transverse bore 72' of the lug 71 so that it cannot separate and the ends lie between the turns 6 of the coil spring 5.

Figure 20:
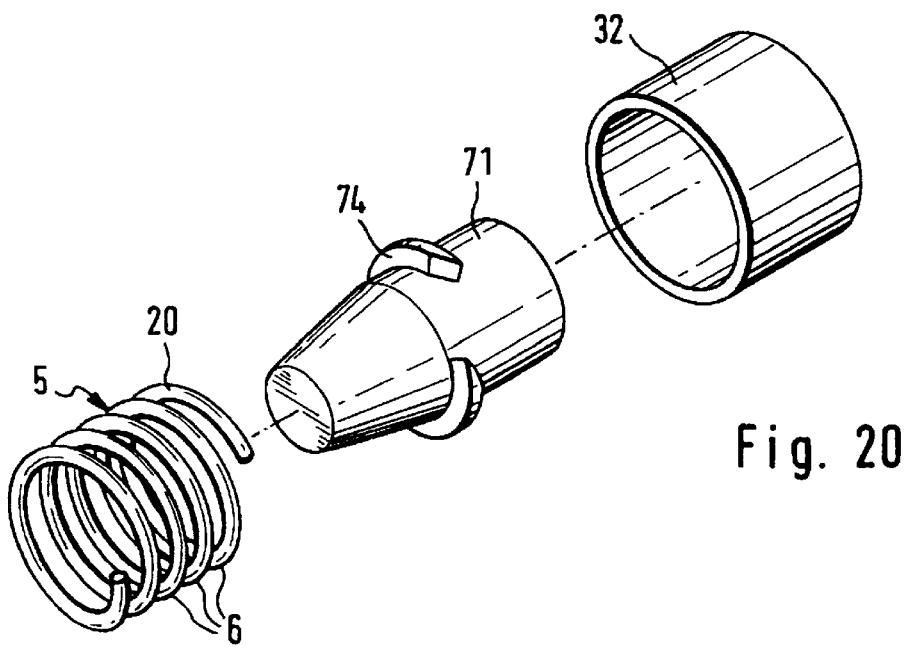
FIG. 20 is a further embodiment of an attachment element having a threaded portion.
Figure 21:
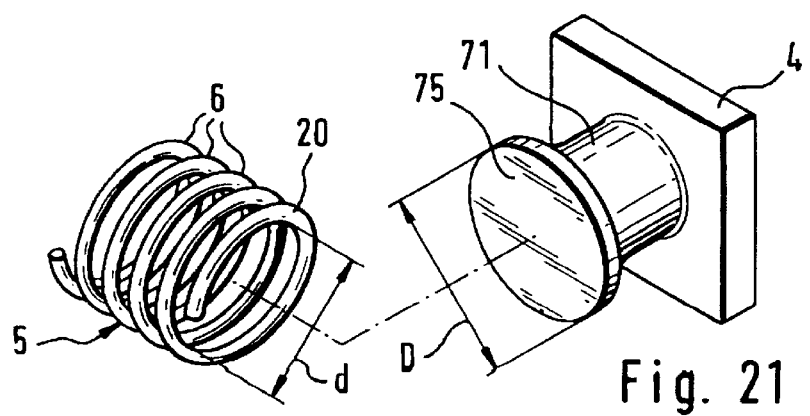
FIG. 21 is a schematic of a further embodiment of an attachment element.

In the embodiment of FIG. 20, the lug 71 is provided with a partial turn 74 of less than 360°. The coil spring 5 is screwed onto the lug 71 with its end 20 whereafter the lug 71 is seated in a sleeve-shaped receptacle 32 so that the turns 6 of the coil spring are held between the lug 71 and the wall of the receptacle 32. The coil spring 5 is axially held so that it cannot separate via the partial winding thread 74. A fixing of the coil spring 5 so that it cannot rotate can take place with the above-described means.

As a departure from the embodiment of FIG. 20, the lug 71 can be expanded plate-like at its end facing toward the coil spring 5. The end plate 75 has a diameter D which is greater than the inner diameter (d) of the end 20 of the coil spring. For providing an inseparable connection of the coil spring 5 to the lug 71 of the component 4, the coil spring is either screwed onto the end plate 75 or is pushed axially onto the plate 71 by widening the turns 6. Fixing the coil spring 5 so that it cannot rotate takes place via the means described above.

Figure 22:
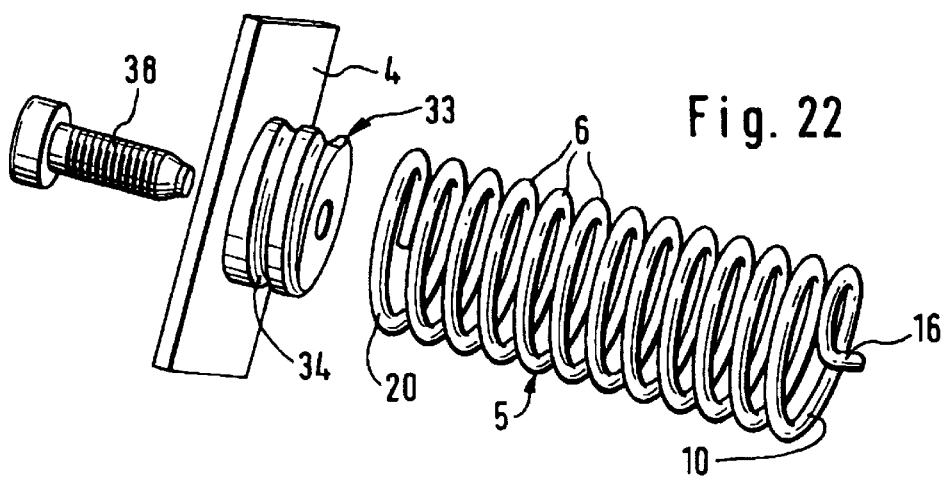
FIG. 22 is a schematic showing an attachment element which is to be mounted in the end of a coil spring.

In the embodiment of FIGS. 22 to 25, differently configured attachment domes 33 are shown as they can be used for fixing the coil spring 5 to a component 4 of the work apparatus. In the embodiment of FIG. 22, the attachment dome 33 is configured as one piece with the component 4 and includes an outer thread 34 onto which the end 20 of the coil spring 5 is screwed. A reliable fixing of the end 20 to the attachment dome 33 is achieved with an attachment screw 38. When the screw 38 is screwed in, the attachment dome 33 is radially expanded.

Figures 23, 24:
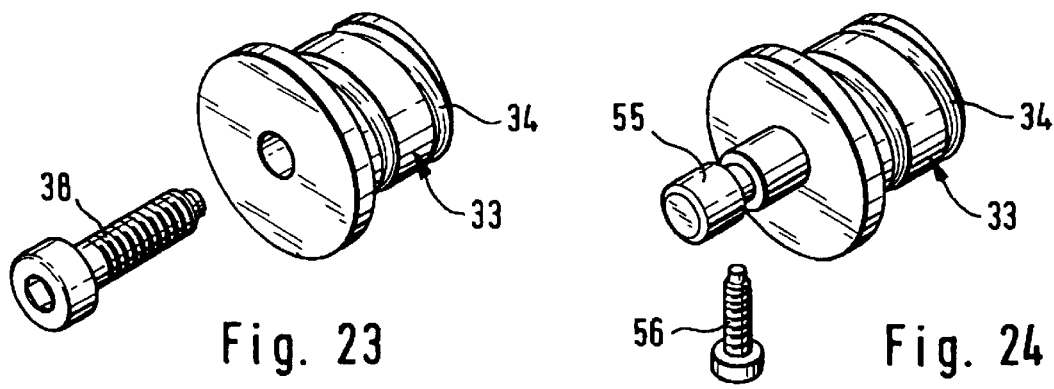
FIG. 23 is a schematic of a dome-shaped attachment element.
FIG. 24 is a schematic of a further dome-shaped attachment element.

It can be advantageous to configure the attachment dome 33 as an element separate from the component 4 as shown in FIG. 23. The attachment dome 33 is then connected to the component 4 by an attachment screw 38 which engages through the component 4.

It can be advantageous to provide the attachment dome of FIG. 24 with a holding lug 55 which engages through a corresponding opening in the component 4 and is at least axially secured on the component 4 by a transverse screw 56.

Figures 25, 26:
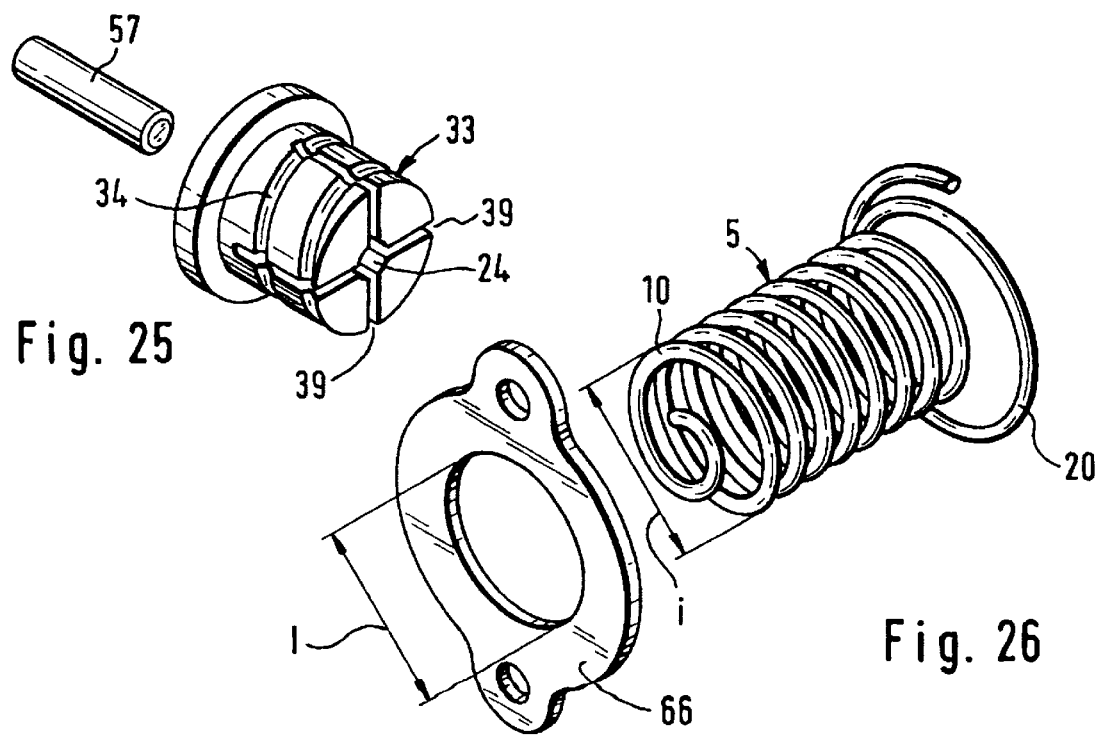
FIG. 25 is a schematic of a dome-shaped expandable attachment element.
FIG. 26 is a schematic of a collar-shaped attachment element for fixing the end of a coil spring.

An anchor-like attachment dome 33 is subdivided into four segments by axial slits 39 as shown in FIG. 25. The segments are radially displaced by axially driving in a widening element 57 whereby the attachment dome 33 widens radially and a fixed contact against the turns of the coil spring 5 which lie in the outer thread 34 is ensured. In lieu of the spreading element 57, an attachment element 38 can be screwed in which simultaneously functions to hold the spreadable attachment dome 33 to the component 4.

In the embodiment of FIG. 26, the end 10 of the coil spring is fixed to a component by an attachment screw. The other end 20 is defined by a turn (especially a spiral turn of larger diameter) over which a diaphragm 66 can be threaded onto the coil spring 5. The inner diameter I of the diaphragm opening corresponds to the outer diameter (i) of the coil spring but is smaller than the maximum outer diameter of the expanded end 20. The diaphragm 66 can be fixed to the component without applying a rotational force to the coil spring 5 by means of screws engaging in the edge of the diaphragm. The component is joined to the end 20 of the coil spring 5.

It is understood that the foregoing description is that of the preferred embodiments of the invention and that various changes and modifications may be made thereto without departing from the spirit and scope of the invention as defined in the appended claims.

What is claimed is:

1. A vibration damper assembly disposed between first and second components of a portable handheld work apparatus wherein the first component is a handle for use by an operator for guiding the work apparatus and the second component is a housing accommodating a motor generating vibrations, the vibration damper assembly comprising:
   a coil spring defining a longitudinal center axis and having first and second ends;
   a first mount provided on said first component for holding said coil spring at said first end thereof;
   a second mount provided on said second component for holding said coil spring on said second end thereof;
   said first and second mounts lying approximately on said longitudinal center axis and being spaced at a distance from each other;
   means for facilitating mounting said coil spring between said first and second mounts from one of said first and second ends of said coil spring; and,
   one of said mounts corresponding to said one end of said coil spring and said one end including means for holding said one end of said coil spring form-tight so as to prevent a rotational movement of said coil spring in the peripheral direction thereof.

2. The vibration damper assembly of claim 1, wherein said work apparatus includes a motor-driven chain saw, a cutoff machine and a blower apparatus; and, said motor is an internal combustion engine.

3. The vibration damper assembly of claim 1, said first mount being a dome-shaped attachment element; and, said first end of said coil spring being screwed onto said dome-shaped attachment element.

4. The vibration damper assembly of claim 1, said first mount being a bushing-shaped attachment element; and, said first end of said coil spring being screwed into said bushing-shaped attachment element.

5. A vibration damper assembly disposed between first and second components of a portable handheld work apparatus wherein the first component is a handle for use by an operator for guiding the work apparatus and the second component is a housing accommodating a motor generating vibrations, the vibration damper assembly comprising:
   a coil spring defining a longitudinal center axis and having first and second ends;
   a first mount provided on said first component for holding said coil spring at said first end thereof;
   a second mount provided on said second component for holding said coil spring on said second end thereof;
   said first and second mounts lying approximately on said longitudinal center axis and being spaced at a distance from each other;
   means for facilitating mounting said coil spring between said first and second mounts from one of said first and second ends of said coil spring;
   one of said mounts corresponding to said one end of said coil spring and said one end including means for holding said one end of said coil spring form-tight so as to prevent a rotational movement of said coil spring in the peripheral direction thereof;
   said second component has a through opening; and,
   said coil spring is adapted so as to permit said first end of said coil spring to be screwed through said through opening to facilitate mounting thereof.

6. The vibration damper assembly of claim 1, said second mount being an attachment module including a plurality of elements coacting with each other.

7. A vibration damper assembly disposed between first and second components of a portable handheld work apparatus wherein the first component is a handle for use by an operator for guiding the work apparatus and the second component is a housing accommodating a motor generating vibrations, the vibration damper assembly comprising:
   a coil spring defining a longitudinal center axis and having first and second ends;
   a first mount provided on said first component for holding said coil spring at said first end thereof;
   a second mount provided on said second component for holding said coil spring on said second end thereof;
   said first and second mounts lying approximately on said longitudinal center axis and being spaced at a distance from each other;
   means for facilitating mounting said coil spring between said first and second mounts from one of said first and second ends of said coil spring;
   one of said mounts corresponding to said one end of said coil spring and said one end including means for holding said one end of said coil spring form-tight so as to prevent a rotational movement of said coil spring in the peripheral direction thereof;
   said second mount being an attachment module including a plurality of elements coacting with each other;
   said attachment module including a through bore extending through said second component and a thread formed in said through bore;
   said through bore having an end facing away from said first mount and a rotation stop formed at said end of said through bore; and,
   said coil spring having a radial counter stop formed thereon for coacting with said rotation stop.

8. The vibration damper assembly of claim 7, wherein said second component has an end face at said end of said through bore facing away from said first mount; said rotation stop being provided on said end face; and, said radial counter stop is a bent-over radially outwardly extending end segment of said coil spring which coacts with said rotation stop.

9. The vibration damper assembly of claim 8, said rotation stop being a ramp having a slope increasing in the screw-in direction.

10. The vibration damper assembly of claim 6, wherein said attachment module includes: a connecting element for form-tightly holding said second end of said coil spring; and, a receptacle on said second component and said receptacle securely accommodating said connecting element so that said connecting element cannot rotate relative to said second component.

11. The vibration damper assembly of claim 10, said connecting element being an attachment dome having an outer thread formed thereon for threadably engaging into said second end of said coil spring.

12. A vibration damper assembly disposed between first and second components of a portable handheld work apparatus wherein the first component is a handle for use by an operator for guiding the work apparatus and the second component is a housing accommodating a motor generating vibrations, the vibration damper assembly comprising:

a coil spring defining a longitudinal center axis and
having first and second ends;

a first mount provided on said first component for holding
said coil spring at said first end thereof;

a second mount provided on said second component for
holding said coil spring on said second end thereof;

said first and second mounts lying approximately on said
longitudinal center axis and being spaced at a distance
from each other;

means for facilitating mounting said coil spring between
said first and second mounts from one of said first and
second ends of said coil spring;

one of said mounts corresponding to said one end of said
coil spring and said one end including means for
holding said one end of said coil spring form-tight so as
to prevent a rotational movement of said coil spring in
the peripheral direction thereof;

said second mount being an attachment module including
a plurality of elements coacting with each other;

said attachment module includes a bushing having an
internal thread and said bushing engaging over said
second end of said coil spring with said internal thread.

13. The vibration damper assembly of claim 12, said
bushing being axially partitioned into two bushing halves
having respective bases; and, a film hinge sprayed onto said
bases for connecting said bushing halves to each other.

14. The vibration damper assembly of claim 12, said
bushing having a rib extending therefrom; and, said second
component having a receptacle for receiving said bushing
therein; and, said receptacle having a slot for receiving said
rib therein.

15. The vibration damper assembly of claim 12, wherein
said attachment module includes a receptacle on said second
component for accommodating said bushing therein; and, a
bayonet connection for fixing said bushing in said receptacle.

16. A vibration damper assembly disposed between first
and second components of a portable handheld work apparatus wherein the first component is a handle for use by an
operator for guiding the work apparatus and the second
component is a housing accommodating a motor generating
vibrations, the vibration damper assembly comprising:

a coil spring defining a longitudinal center axis and
having first and second ends;

a first mount provided on said first component for holding
said coil spring at said first end thereof;

a second mount provided on said second component for
holding said coil spring on said second end thereof;

said first and second mounts lying approximately on said
longitudinal center axis and being spaced at a distance
from each other;

means for facilitating mounting said coil spring between
said first and second mounts from one of said first and
second ends of said coil spring;

one of said mounts corresponding to said one end of said
coil spring and said one end including means for
holding said one end of said coil spring form-tight so as
to prevent a rotational movement of said coil spring in
the peripheral direction thereof;

said second mount being an attachment module including
a plurality of elements coacting with each other;

said attachment module includes: a connecting element
for form-tightly holding said second end of said coil
spring;

a receptacle on said second component and said receptacle securely accommodating said connecting element
so that said connecting element cannot rotate relative to
said second component; and, said connecting element including a first set of teeth and
said receptacle including a second set of teeth meshing
with said first set of said teeth.

17. A vibration damper assembly disposed between first
and second components of a portable handheld work apparatus wherein the first component is a handle for use by an
operator for guiding the work apparatus and the second
component is a housing accommodating a motor generating
vibrations, the vibration damper assembly comprising:

a coil spring defining a longitudinal center axis and
having first and second ends;

a first mount provided on said first component for holding
said coil spring at said first end thereof;

a second mount provided on said second component for
holding said coil spring on said second end thereof;

said first and second mounts lying approximately on said
longitudinal center axis and being spaced at a distance
from each other;

means for facilitating mounting said coil spring between
said first and second mounts from one of said first and
second ends of said coil spring;

one of said mounts corresponding to said one end of said
coil spring and said one end including means for
holding said one end of said coil spring form-tight so as
to prevent a rotational movement of said coil spring in
the peripheral direction thereof;

said second mount being an attachment module including
a plurality of elements coacting with each other; and,
said attachment module includes a receptacle having a
first part formed as part of said second component and
a second part joined to said first part so that said first
and second parts conjointly define a receptacle completely surrounding and engaging said second end of
said coil spring.

18. The vibration damper assembly of claim 17, wherein
said first part is a U-shaped receptacle having first and
second legs; and, said second part being held between said
legs so as to cause said first and second parts to completely
surround and engage said second end of said coil spring.

19. A vibration damper assembly disposed between first
and second components of a portable handheld work apparatus wherein the first component is a handle for use by an
operator for guiding the work apparatus and the second
component is a housing accommodating a motor generating
vibrations, the vibration damper assembly comprising:

a coil spring defining a longitudinal center axis and
having first and second ends;

a first mount provided on said first component for holding
said coil spring at said first end thereof;

a second mount provided on said second component for
holding said coil spring on said second end thereof;

said first and second mounts lying approximately on said
longitudinal center axis and being spaced at a distance
from each other;

means for facilitating mounting said coil spring between
said first and second mounts from one of said first and
second ends of said coil spring;

one of said mounts corresponding to said one end of said
coil spring and said one end including means for
holding said one end of said coil spring form-tight so as
to prevent a rotational movement of said coil spring in
the peripheral direction thereof; and, said coil spring has a radially bent over end segment form-tightly engaging into said second mount on said second component.

20. A vibration damper assembly disposed between first and second components of a portable handheld work apparatus wherein the first component is a handle for use by an operator for guiding the work apparatus and the second component is a housing accommodating a motor generating vibrations, the vibration damper assembly comprising:

a coil spring defining a longitudinal center axis and having first and second ends;

a first mount provided on said first component for holding said coil spring at said first end thereof;

a second mount provided on said second component for holding said coil spring on said second end thereof;

said first and second mounts lying approximately on said longitudinal center axis and being spaced at a distance from each other;

means for facilitating mounting said coil spring between said first and second mounts from one of said first and second ends of said coil spring;

one of said mounts corresponding to said one end of said coil spring and said one end including means for holding said one end of said coil spring form-tight so as to prevent a rotational movement of said coil spring in the peripheral direction thereof;

said second mount includes a lug engaging into said second end of said coil spring; and, said lug being connected to a turn of said coil spring so as not to be separable therefrom.

21. The vibration damper assembly of claim 20, wherein said lug has a securing member extending beyond the outer periphery of said coil spring; and, said securing member extending between two mutually adjacent turns of said coil spring.

22. The vibration damper assembly of claim 21, wherein said securing member is a securing pin mounted on said lug.

23. The vibration damper assembly of claim 21, wherein said securing member is a securing ring which snaps onto said lug to hold said coil spring.

24. The vibration damper assembly of claim 21, wherein said securing member is a part thread formed on said lug to engage and hold said second end of said coil spring.

25. The vibration damper assembly of claim 21, wherein said coil spring has an inner diameter; and, said securing member is a plate formed on said lug and said plate has an outer diameter greater than said inner diameter.

26. A vibration damper assembly disposed between first and second components of a portable handheld work apparatus wherein the first component is a handle for use by an operator for guiding the work apparatus and the second component is a housing accommodating a motor generating vibrations, the vibration damper assembly comprising:

a coil spring defining a longitudinal center axis and having first and second ends having respective sets of end turns;

a first mount provided on said first component for holding said coil spring at said first end thereof;

a second mount provided on said second component for holding said coil spring on said second end thereof;

said first and second mounts lying approximately on said longitudinal center axis and being spaced at a distance from each other;

one of said mounts being a first threaded holder for threadably engaging the end turns of one of said ends of said coil spring and said first threaded holder being immovably disposed on the component corresponding thereto;

said holder defining a stop to limit the extent to which said one end of said coil spring can threadably engage said threaded holder;

said threaded engagement and said stop being the only and exclusive attachment of said one end of said coil spring to said holder whereby no torsion force is imparted to said coil spring at said holder;

the other one of said mounts being a second threaded holder for threadably engaging the end turns of the other one of said ends of said coil spring; and, said second threaded holder being disposed in or on the component corresponding thereto so as to ensure that no torsion force is imparted to said coil spring by said first and second holders when said coil spring is mounted therebetween whereby the vibration damping characteristic of said coil spring is determined exclusively by the material characteristics of said coil spring.

* * * * *